April 10, 1956  W. P. OEHLER ET AL  2,741,494
HITCH DEVICE
Filed Feb. 13, 1952  2 Sheets-Sheet 2
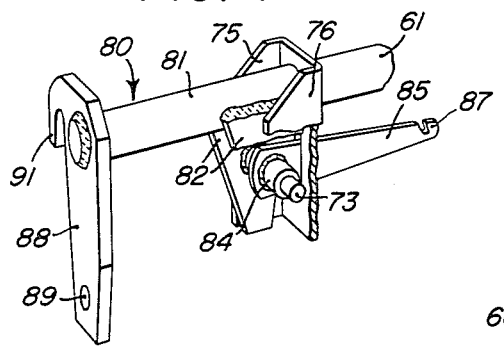
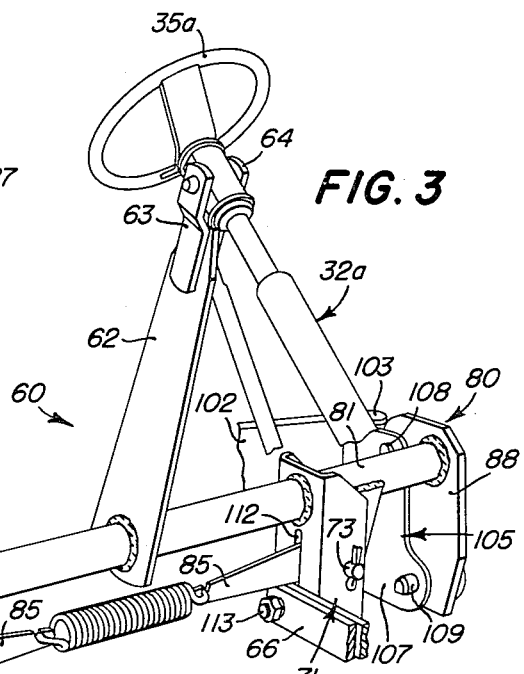
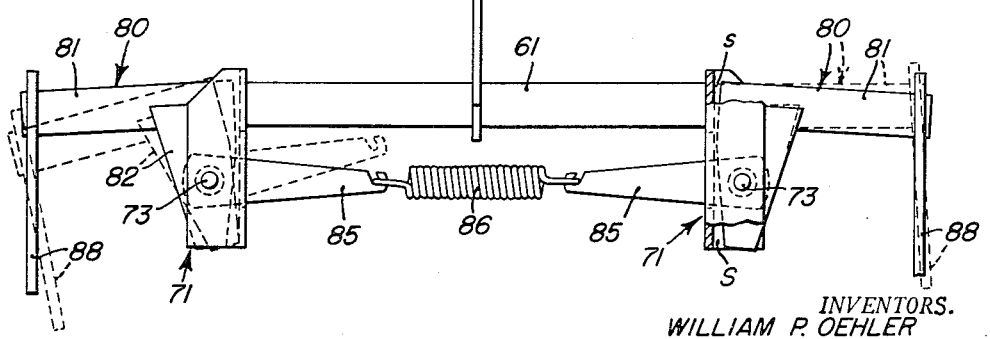
INVENTORS.
WILLIAM P. OEHLER
ARTHUR J. IMMESOETE
ATTORNEYS United States Patent Office 2,741,494
Patented Apr. 10, 1956

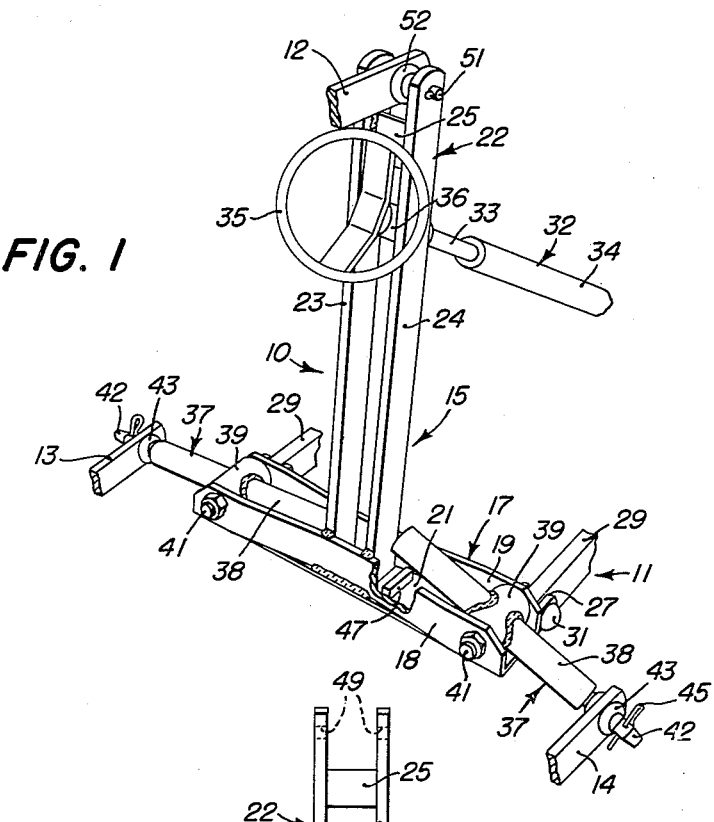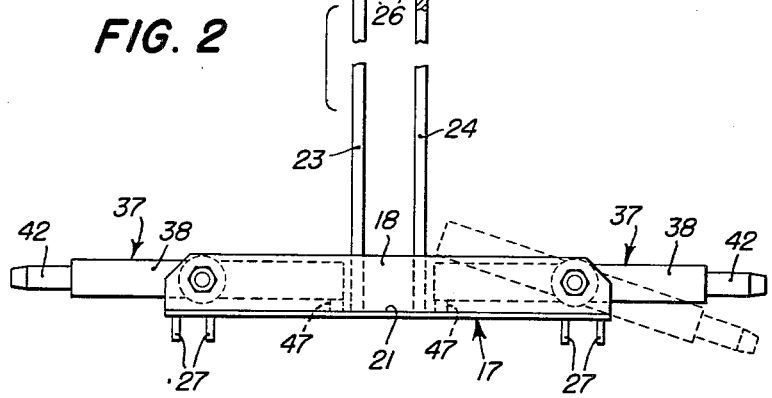

2,741,494

HITCH DEVICE

William P. Oehler and Arthur J. Immesoete, Moline, Ill., assignors to Deere & Company, Moline, Ill., a corporation of Illinois Application February 13, 1952, Serial No. 271,378

12 Claims. (Cl. 280—446)

The present invention relates generally to agricultural implements and more particularly to hitch devices and the like for connecting implements with propelling means, such as a farm tractor or the like.

The object and general nature of the present invention is the provision of a new and improved hitch device especially adapted to connect implements that in operation normally tilt laterally about a generally fore-and-aft extending axis with a tractor raising and lowering means that normally is held against movement relative to the tractor about a generally fore-and-aft extending axis. More particularly, it is an important feature of this invention to provide a new and improved hitch device for connecting an implement, which normally follows the contour of the ground and hence tilts laterally with variations in the ground surface, with a tractor having a drawbar arrangement that is adapted to be raised and lowered relative to the tractor but which is not capable of any torsional displacement, or movement relative to the tractor about a longitudinal axis.

Further, it is a feature of this invention to provide a tractor-implement hitch mechanism which includes a relatively rigid frame section and a pair of laterally disposed, independently movable parts attachable to the tractor drawbar means, such parts functioning to permit the central frame section to tilt laterally relative to the tractor, with means for connecting the implement to the central section of the hitch device. Additionally, it is a feature of this invention to provide means whereby the shiftable means of the hitch device is held in a central or intermediate position but which does not interfere with lateral tilting of the implement and normally functions to hold the hitch device in a position facilitating its easy, rapid and convenient connection to the implement-receiving means on the tractor.

These and other objects of the present invention will be apparent to those skilled in the art after a consideration of the following detailed description, taken in conjunction with the accompanying drawings, in which:

Figure 1 is a perspective view of a hitch device constructed according to the principles of the present invention and especially adapted to connect a ground-working implement with the upper and lower link means of a farm tractor.

Figure 2 is a front view, looking rearwardly, of the hitch device shown in Figure 1, certain portions being omitted in the interests of clarity.

Figure 3 is a perspective view of a modified form of this invention, in which the hitch device is especially adapted for use with a tractor or other supporting and/or propelling means equipped with a pair of generally vertically movable coupling members.

Figure 4 is a fragmentary detail view of one of the laterally extending, generally vertically swingable implement-connecting members.

Figure 5 is a front view, looking rearwardly, of the hitch device shown in Figure 3, certain portions being omitted in the interests of clarity.

Referring first to the form of the invention shown in Figures 1 and 2, the hitch device is indicated in its entirety by the reference numeral 10 and is shown as connecting an implement 11 to a propelling agency, such as a tractor, through the upper and lower links 12, 13 and 14 of the tractor.

The hitch device includes a generally vertical frame means 15 which comprises a lower transverse channel-like member 17 having front and rear flanges 18 and 19 and a lower web portion 21, and a vertical mast section 22 that is made up of a pair of vertical bars 23 and 24 secured, as by welding, to the central portions of the front and rear flanges 18 and 19, and to the web 21, if desired. The upper ends of the bars 23 and 24 are connected in spaced-apart relation by a plate 25 secured, as by welding, to the upper portions of the bars 23 and 24. Preferably, the central portions of the flanges 18 and 19 are bent inwardly toward the lower ends of the bars 23 and 24, as best shown in Figure 1, before the latter are welded at their lower ends thereto. Secured to the ends of the rear flange 19 and the end portions of the web section 21 are two pairs of implement-receiving lugs 27, the latter being spaced apart to receive forwardly extending frame members 29 of the implement 11, the lugs 27 being apertured to receive the hitch pins 31, by virtue of which the implement 11 is pivotally connected with the hitch frame 10. The position of the implement may be varied, as desired, relative to the hitch frame 10 by means of an adjustable strut member 32, the effective length of which is controlled by turning a screw member 33 relative to an associated sleeve member 34 by a hand wheel 35 or the like. The upper end of the member 33 is carried in a trunnion 36 pivotally connected in openings 26 in the upper portions of the hitch frame bars 23 and 24. The lower end of the member 33 is threaded into the associated sleeve member 34.

For connecting the implement 11 to the tractor or other propelling agency so that the implement may tilt laterally about a generally fore-and-aft extending axis relative to the tractor draft links 13 and 14, which are connected to the tractor mechanism to be raised and lowered rigidly together so far as vertical movement of one relative to the other is concerned, we provide a pair of swingable members 37 at each end of the lower transverse frame member 17 of the hitch frame 10. Each of the vertically swingable members 37 includes a rod or shaft section 38 and a hub portion 39 connected at fore-and-aft spaced points with the adjacent end of the frame member 17 by suitable bearing means mounted on a short shaft 41 carried in any suitable way by the flanges 18 and 19. At its outer end, each of the pivoted members 38 is provided with a portion 42 of reduced diameter and pointed at its outer end, whereby each portion 42 is adapted to be readily inserted in the apertured portions of ball connectors 43 that normally form a part of the tension links 13 and 14, at the rear ends thereof. The portions 42 of reduced diameter are apertured to receive a retaining pin 45. The inner ends of the swingable members 38 are limited in their vertical swinging by a stop 47 fixed to the web 21 of the channel 17, one stop member 47 being at each side of the hitch frame mast portion 15 and located so that the inner ends of the associated members 38 are adapted to contact therewith, thereby limiting the upward swinging of the outer ends of the members 38 relative to the hitch frame member 17. The members 38 and 39 are so formed that the inner ends of the members 38 overbalance the outer ends, whereby in normal position, the members 38 are held in laterally outwardly extending aligned relation, as best shown in Figure 2. The outer ends of the members 37 are adapted to move in a generally vertical direction, as will be seen from Figure 2, and the fore-and-aft spaced ends of the hub portions 39 have sufficient rigidity to transmit the pull of the tractor to the central frame member 17. The upper ends of the mast bars 23 and 24 are apertured, as at 49, to receive a quick-detachable pin 51 on which the bail connector 52 at the rear end of the upper compression link 12 is mounted.

By virtue of the construction described above, the implement 11 may tilt relative to the tractor about a generally fore-and-aft extending axis, since either of the swingable members 37 may swing downwardly, as into the position shown in Figure 1, thus accommodating a tilt of the implement relative to the tractor in the other direction; that is, the position of the hitch parts shown in Figure 1 indicates that the implement 11 has been tilted to the right relative to the tractor, since the outer end of the left-hand member 37 has been swung downwardly relative to the channel 17. The terms "right" and "left" as used refer to the outfit when standing back of the same and looking forwardly. Notwithstanding the provision of the swingable members 37, and associated parts, whenever the tractor power lift mechanism is actuated to raise the links 13 and 14, the inner ends of the members 38 swing against the stops 47, whereupon further lifting movement imparted to the links 13 and 14 serves to raise the implement hitch frame 10, thereby elevating the implement 11 therewith.

A modified form of the present invention is shown in Figures 3–5. In this form of the invention the hitch frame is indicated in its entirety by the reference numeral 60 and includes a central transverse section 61, preferably in the form of a pipe or shaft, to the middle portion of which a bracket 62 is fixed and extended upwardly therefrom. An adjustable strut member 32a, which may be substantially like the member 32 described above, is connectible to the upper end of the bracket 62 by virtue of a pair of hammer straps 63 and 64 fixed to the upper end of the bracket 62. The rear end of the strut member 32a, like the strut member 32 described above, is connected at its rear end (not shown) to an implement of the ground-engaging or ground-working type, indicated generally by the reference numeral 65 and which includes a pair of right- and left-hand frame members 66 and 67 that are apertured at their forward ends. The transverse hitch frame section 61 has a pair of depending arms 71 connected rigidly to the ends thereof, as by welding, and each of the arms 71 comprises a channel-like section providing pairs of fore-and-aft spaced apart flanges for receiving a pivot pin 73. The front and rear flanges of each of the depending arms 71 are indicated by the reference numerals 75 and 76.

A pair of swingably mounted members, each indicated by the reference numeral 80, is pivotally connected to the lower portions of the depending arms 71, each member 80 comprising a pipe section 81 and a pair of depending brackets 82 welded to the inner end of the associated pipe section 81. The lower portions of the bracket members 82 are apertured to receive the associated pivot pin 73, and welded to the brackets 82 of each pair is a fore-and-aft extending sleeve 84 to which the outer end of an inwardly extending arm 85 is rigidly secured, as by welding. The laterally inner end of each arm 85 is formed with a hook 87 (Figure 4) to receive an interconnecting tension spring 86. At the outer end of each of the pipe sections 81 is a vertical coupling plate 88 that is secured to the associated pipe section 81 by welding or the like and is provided at its lower end with an aperture 89 and at its upper end with a hook section 91.

As best shown in Figure 5, the parts are so constructed that when the spring 86 is connected between the arms 85, the pipe sections 81 extend outwardly and slightly downwardly. However, the coupling plates 88 are so fixed to the pipe sections 81 that in this position of the latter members, the plates 88 are disposed in vertical planes and lie generally parallel with respect to one another. The purpose of this arrangement is to facilitate attachment of the hitch device 60 to a propelling tractor or the like, particularly one which is provided with a pair of rearwardly diverging, laterally swingable sway links 101 and 102 (Figure 3) to the rear ends of which are swingably carried, as on vertical pins 103, a pair of coupling members 105, each of which comprises laterally spaced-apart plates 106 and 107, the upper portions of which carry a coupling pin 108 and the lower portions of which are apertured to receive a detachable coupling pin 109. Through suitable means (not shown) the coupling members 105 are maintained in parallel, generally vertical position with respect to the tractor although both coupling members 105 may swing laterally relative to the tractor by virtue of the sway links 101 and 102.

As best shown in Figure 5, the parts are constructed and arranged that there is a clearance S between the lower ends of the brackets 82 and the lower portion of the associated depending arms 71, there also being a clearance s between the inner end of each of the pipe sections 81 and the associated upper portion of the depending arm 71. By virtue of this construction, each member 80 can swing vertically about the axis 73, between a position, indicated in dotted lines in the left-hand portion of Figure 5 to the position shown in dotted lines at the right-hand side of Figure 5. Thus, the implement 65 may tilt laterally relative to the tractor supporting the sway links 101 and associated structure about a generally fore-and-aft extending axis. However, when the hitch device 60 is detached from the tractor, the spring 86 functions to hold the attaching plates 88 in a generally vertical position and therefore supports them in a position facilitating the backing of the tractor into position relative to the hitch device, bringing the coupling member plates 106 and 107 into position on opposite sides of the coupling plates 88 carried by the hitch device on the implement.

When the power lift unit of the tractor is actuated to raise the sway links 101 and 102, and associated parts, the inner ends of the members 81 come up against the upper ends of the arms 71, whereupon further movement of the members 80 relative to the frame section 61 is prevented and further raising movement results in raising the hitch frame and the implement connected therewith. The lower portions of the depending arms 71 are slotted, as at 112, to accommodate the inwardly extending arms 85, and the lower portions of the depending arms are also apertured to receive bolts 113 or other suitable means pivotally connecting the forward ends of the frame members 66 and 67 to the hitch device 60.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. For use with a tractor or the like having generally laterally spaced apart implement-receiving means normally movable vertically together: an implement hitch device for connecting an implement, adapted to be tilted generally laterally about a generally fore-and-aft extending axis relative to the tractor, to said implement-receiving means, said hitch device comprising a generally rigid central frame section, a pair of members connected in laterally spaced apart relation with said central frame section for generally vertical movement relative thereto independently of each other, and means on said members acting in directions generally transversely of the directions of movement of said members for transmitting the pull of the tractor to said central frame section.

2. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section, and a pair of laterally outwardly extending members extending laterally outwardly beyond said frame section, each member being hingedly connected with said central frame section at fore-and-aft spaced apart points for swinging movement relative thereto about a generally fore-and-aft extending axis.

3. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section, a pair of laterally outwardly extending members pivotally connected with said central frame section for swinging movement relative thereto about a generally fore-and-aft extending axis, means on the laterally outer end portions of said pivoted members for connection to said generally vertically movable implement-receiving means, and stop means on said frame section engageable with the inner ends of said pivoted members.

4. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section, a pair of laterally outwardly extending members pivotally connected with said central frame section for swinging movement relative thereto about generally fore-and-aft extending axes, and stop means acting between the inner ends of said members and said frame section for limiting the downward movement of the inner ends of said members relative to said frame section, whereby said implement may be raised by raising said implement-receiving means.

5. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section having a lower transverse portion and an upper mast portion, a pair of laterally outwardly extending members pivotally connected, each at generally fore-and-aft spaced apart points, with the outer end portions of said transverse frame portion, means on the outer end portions of said pivoted members for connection to said generally vertically movable implement-receiving means, and an implement connection at the upper portion of said mast portion.

6. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section, a pair of laterally outwardly extending members pivotally connected with said central frame section for swinging movement relative thereto about generally fore-and-aft extending axes, implement-receiving means at the outer end of each of said pivoted members, and resilient means connected with said members and extending directly from one to the other so as to act therebetween for holding them in an implement-engaging position.

7. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section, a pair of laterally outwardly extending members pivotally connected at their inner ends with the laterally outer portions of said frame section for movement relative thereto in opposite directions from an intermediate position, implement-receiving means connected to the laterally outer ends of said members, inwardly extending arms fixed to said members, said arms extending generally toward each other, and a spring acting between the inner end portions of said arms for yieldably holding said pivoted members in their intermediate positions.

8. For use with a tractor or the like having generally laterally spaced apart implement-receiving means normally movable vertically together: an implement hitch device for connecting an implement, adapted to be tilted generally laterally, to said implement-receiving means, said hitch device comprising a generally rigid central frame section including a transverse frame part having depending arms fixed to the ends of said frame part, and a pair of laterally outwardly extending members pivotally connected with said frame part, and each pivoted member having a depending part pivotally connected at fore-and-aft spaced points with the lower portion of the associated depending frame arm.

9. The invention set forth in claim 8, further characterized by an upstanding strut on said frame part, and implement frame-connecting means on the lower portions of said depending arms.

10. The combination with a tractor having generally laterally spaced apart implement-receiving means movable generally vertically, and means interconnecting said implement-receiving means constraining the latter to move vertically together, of an implement hitch device for connecting an implement, adapted to be tilted generally laterally, to said implement-receiving means, said hitch device comprising a generally rigid central frame section including a transverse frame part having depending arms fixed to the ends of said frame part, and a pair of laterally outwardly extending members, each member having a depending part pivotally connected at fore-and-aft spaced points with the lower portion of the associated depending frame arm.

11. The combination with a tractor having generally laterally spaced apart implement-receiving means movable generally vertically, and means interconnecting said implement-receiving means constraining the latter to move vertically together, of an implement hitch device for connecting an implement, adapted to be tilted generally laterally, to said implement-receiving means, said hitch device comprising a generally rigid central frame section, a pair of laterally outwardly extending members extending laterally outwardly beyond said frame section, means swingably connecting the laterally inner ends of said laterally outwardly extending members with the laterally outer ends of said rigid central frame section, and means at the laterally outer ends of said laterally outwardly extending members for pivotally receiving said implement-receiving means.

12. The invention set forth in claim 11, further characterized by generally transversely extending spring means, and means connecting the laterally outer ends of said spring means with the laterally inner end portions, respectively, of said laterally outwardly extending members for yieldably holding them in an implement-receiving position.

References Cited in the file of this patent

UNITED STATES PATENTS

| 1,556,508 | Hentzell et al. | Oct. 6, 1925 |
| 2,150,269 | Dreisbach | Mar. 14, 1939 |
| 2,551,870 | Bridger | May 8, 1951 |

FOREIGN PATENTS

| 554,918 | Germany | July 13, 1932 |